(12) United States Patent
Dillaway et al.

(10) Patent No.: US 7,774,830 B2
(45) Date of Patent: Aug. 10, 2010

(54) ACCESS CONTROL POLICY ENGINE CONTROLLING ACCESS TO RESOURCE BASED ON ANY OF MULTIPLE RECEIVED TYPES OF SECURITY TOKENS

(75) Inventors: Blair Brewster Dillaway, Clyde Hill, WA (US); John L. Manferdelli, Redmond, WA (US); Shawn Martin Woods, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1437 days.

(21) Appl. No.: 11/080,806

(22) Filed: Mar. 14, 2005

(65) Prior Publication Data

US 2006/0206931 A1    Sep. 14, 2006

(51) Int. Cl.
*H04L 9/32* (2006.01)
(52) U.S. Cl. .......................... 726/9; 726/28; 713/172; 713/175
(58) Field of Classification Search ......... 713/172–176; 726/2, 5, 9, 1, 17, 26–30; 380/229
See application file for complete search history.

(56) References Cited

U.S. PATENT DOCUMENTS

| 6,675,296 | B1* | 1/2004 | Boeyen et al. | 713/156 |
|---|---|---|---|---|
| 7,313,692 | B2* | 12/2007 | Weeks et al. | 713/156 |
| 2004/0148514 | A1* | 7/2004 | Fee et al. | 713/200 |
| 2006/0195690 | A1* | 8/2006 | Kostal et al. | 713/156 |
| 2006/0206707 | A1* | 9/2006 | Kostal et al. | 713/156 |

\* cited by examiner

*Primary Examiner*—Benjamin E Lanier
*Assistant Examiner*—Hadi Armouche
(74) *Attorney, Agent, or Firm*—Woodcock Washburn LLP (57) ABSTRACT

An access control policy engine associated with a resource determines whether to allow a request to access same. The engine receives the request with an security token, retrieves the token determines a type thereof, and maps access decision information in the token to a common format as at least one security claim setting forth adequate information to determine a right of the requestor. Thereafter, the engine retrieves a set of rules for accessing the resource, applies the rules to the security claims to determine whether to allow the request from the requestor, and if the request is to be allowed, provides the requestor access to the resource in accordance with the request and the rights of the requestor as determined based on the security claims.

16 Claims, 4 Drawing Sheets

ACCESS CONTROL POLICY ENGINE CONTROLLING ACCESS TO RESOURCE BASED ON ANY OF MULTIPLE RECEIVED TYPES OF SECURITY TOKENS

TECHNICAL FIELD

The present invention relates to an access management system whereby access to a resource such as digital content or a digital service is provided only in accordance with a corresponding grant of access as expressed in a digital security token accompanying the request. More particularly, the invention relates to such an access management system with an access control policy engine that can accept any of multiple received types of security tokens, containing requestor identity and attribute information and/or authorization information, and that can convert the information in the received token into a common format.

BACKGROUND OF THE INVENTION

Access management is highly desirable in connection with granting access to a digital resource such as a digital service or digital content, which may include digital audio, digital video, digital text, digital data, digital multimedia, etc. The resource can be the aforementioned content or the like, a server or the like having a library of content or the like, or any other or digital repository of information that a user might wish to access such as for example an electronic mail server, a gaming server, a network access server or point, etc. Likewise, the resource can be a service, such as a printer, a compiler, a renderer, or the like.

Typically, in an access management context, a requestor is granted access to a resource upon presenting a request with a security token identifying the requestor where this identity information allows one to determine the rights the requestor has with respect to the resource based on local authorization policy, among other things. In other systems, the security token may include an authorization expression directly which determines the rights the requestor has with respect to the resource, among other things. For example, the security token may comprise a digital certificate issued to and identifying the requestor and the rights thereof. In any event, the security token is typically issued to the requestor by an issuer that is known to and trusted by the resource. For example, within the context of an organization, the resource may be a data server, and the issuer may be an identity server set up by an administrator to provide an identifying security token to each member of the organization. Note, though, that the issuer may also be an identity server external to the organization and acceptable to the resource.

Typically, the resource includes or is accessed by way of an access control policy engine or the like that initially receives the request with the security token and decides based on the security token and perhaps other information whether the requestor is entitled to access to the requested resource. Upon satisfying itself that the requestor is in fact so entitled, the access control policy engine forwards the request to the resource for response thereby. For example, if the request is for a data file from the resource, the resource provides such data file, and if the request is to review information available from the resource, the resource allows the requestor to in fact review such information.

Notably, in at least some instances the resource provides data to the requestor. If so, the resource may choose to encrypt the data according to a format that allows the requestor to decrypt same, but not others. For example, it may be that the presented security token of the requestor is a digital certificate that includes a public key associated therewith, and the resource encrypts the provided data according to the public key of the presented security token. Thus, the requestor may apply a corresponding private key associated with the digital certificate to the encrypted data to reveal same.

Also notably, the resource may choose to attach terms and conditions to the encrypted data that the requestor must abide by. If so, and again presuming that the presented security token of the requestor is a digital certificate that includes a public key associated therewith, the resource may encrypt the provided data according to a selected symmetric key, encrypt the symmetric key according to the public key of the presented security token, and place the encrypted symmetric key and the terms and conditions in a digital license. Thus, the requestor may apply the corresponding private key associated with the digital certificate to the encrypted symmetric key of the license to reveal same, and then apply the decrypted symmetric key to the encrypted data to reveal same, presuming of course that the terms and conditions in the license so allow.

The security token accompanying a request for access to a resource may take any of several forms, especially if the resource is being accessed by a diverse group of requestors. Thus, the security token as received by an access control policy engine for the resource may be any of several types, such as for example an X.509 certificate, a Kerberos ticket, an XML-based digital certificate, a SAML token, an ISO MPEG REL license, or the like. The security token may indeed be simply a username with a corresponding password.

At any rate, the access control policy engine (access control policy engine) for a resource should be able to handle any of a plurality of types of received security tokens and be able to process same. Of course, dealing with multiple types of security tokens adds complexity to the access control policy engine, especially if the access control policy engine does not operate based on account-based information but instead must judge whether to grant access in connection with a request based primarily on the content of the security token or tokens accompanying such request.

That is, with the continued evolution to a globally interconnected world and complex distributed applications, account-based access is not considered adequate. As may be appreciated, in such account-based access, a requestor would create an account with or available to the access control policy engine prior to issuing a request to same, and the access control policy engine in deciding whether to grant access based on a request would refer to such account. Instead of account-based access, then, an access control policy engine may need to grant access based on a request from a requestor with which the access control policy engine has no prior established relationship, relying only on the security token proffered with the request from such requestor and identifying same. Presumably, then, the security token includes therewith at least some information that the access control policy engine may employ in deciding whether to grant access based on the request on a variety of identifying information in making these decisions. To deal with these realities, a variety of security tokens types are now commonly in use. Notably, the aforementioned, X.509 certificate, the SAML token, and the ISO MPEG REL license are examples of security tokens that can be used when a requestor and the resource with the access control policy engine may not have a prior established relationship.

Unfortunately, each type of security token format evolved as an independent standard, designed to address specific types of problems and having a disparate encoding format, information carrying capabilities, and semantics. In addition, each type of security token was introduced into computing environments in an incremental fashion. Thus, rather than being able to deal with only a single type of security token, an access control policy engine must instead have an interface for manipulating each type of security token to expose and employ the information contained with such type of security token. As may be appreciated, then, adapting an access control policy engine to accept a new type of security token is costly and difficult. Alternatively, and perhaps worse, an access control policy engine must assume that requestors will be using a specific type of security token.

Of course, either situation creates difficulties in adapting to new business models, evolving to support new relationships between organizations and individuals, handling dynamic relationships, taking into account richer information about a requestor in making an access decision, and providing seamless scalability. For example, an access control policy engine originally designed assuming enterprise account-based security tokens cannot easily adapt to handle security tokens for requestors outside the enterprise. Similarly, an access control policy engine designed to use X.509 security tokens cannot easily move to support Kerberos, SAML or REL security tokens.

Existing approaches to addressing such problems have had limited success. The most common approach has been for the access control policy engine to force all security tokens to map to locally managed accounts, where the access control policy engine then makes each access control decision based solely on a corresponding local account. However, it is to be appreciated that it is costly for an access control policy engine to maintain local accounts for external entities, often with transient business relationships. Moreover, relying on local accounts means that any rich semantics or data encoded in a security token are lost in doing the translation to the corresponding local account. It also fails to provide support for evolving business needs in which an administrative entity determines the allowed access for a requestor and encodes that information directly into a security token which is presented to the access control policy engine. At any rate, forcing semantics not intended for accounts, such as mapping application or organization identify to a user account, creates semantics problems that can affect manageability.

Another approach has been for the access control policy engine to include multiple paths, each which handles a specific security token format. In such a situation, however, only a single type of security token can be handled per request and any unification across types is based on application specific logic. The net result is duplicative effort and lack of a common unification paradigm that supports common access control policies.

Accordingly, a need exists for a new type of access control policy engine that can control access to a resource based on any of multiple received types of security tokens, and without the need for local accounts or multiple paths. In particular, a need exists for such an access control policy engine that maps the information in each of one or more types of security token received with a request to a common access-decision format, and that then decided whether to grant access based on the commonly formatted access-decision information. Further, a need exists for such an access control policy engine that handles mapping each type of security token based on a corresponding mapping module, whereby the access control policy engine can accommodate a new type of security token based on a corresponding new mapping module.

SUMMARY OF THE INVENTION

The aforementioned needs are satisfied at least in part by the present invention in which a method is provided in connection with a requestor submitting a request to access a digital resource. The request includes at least one security token associated with the requestor, where each security token of the request contains access decision information useful for determining whether to allow the request, and where each security token has one of a plurality of types. In the method, an access control policy engine associated with the resource determines whether to allow the request. Such access control policy engine receives the request with each security token thereof, retrieves each security token from the request, and processes each retrieved security token by determining the type of such retrieved security token and mapping the access decision information in the retrieved security token to the common format as at least one security claim setting forth sufficient information for the access control policy engine to determine the rights of the requestor with respect to the desired resource.

Thus, the access control policy engine has a set of security claims relating to the request after having processed the retrieved tokens. Thereafter, the engine retrieves a set of rules for accessing the resource, applies the retrieved set of rules to the set of security claims to determine whether to allow the request from the requestor, and if the request from the requestor is to be allowed, provides the requestor access to the resource, via an associated resource manager, in accordance with the request and the attributes and rights of the requestor as set forth within the set of security claims.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
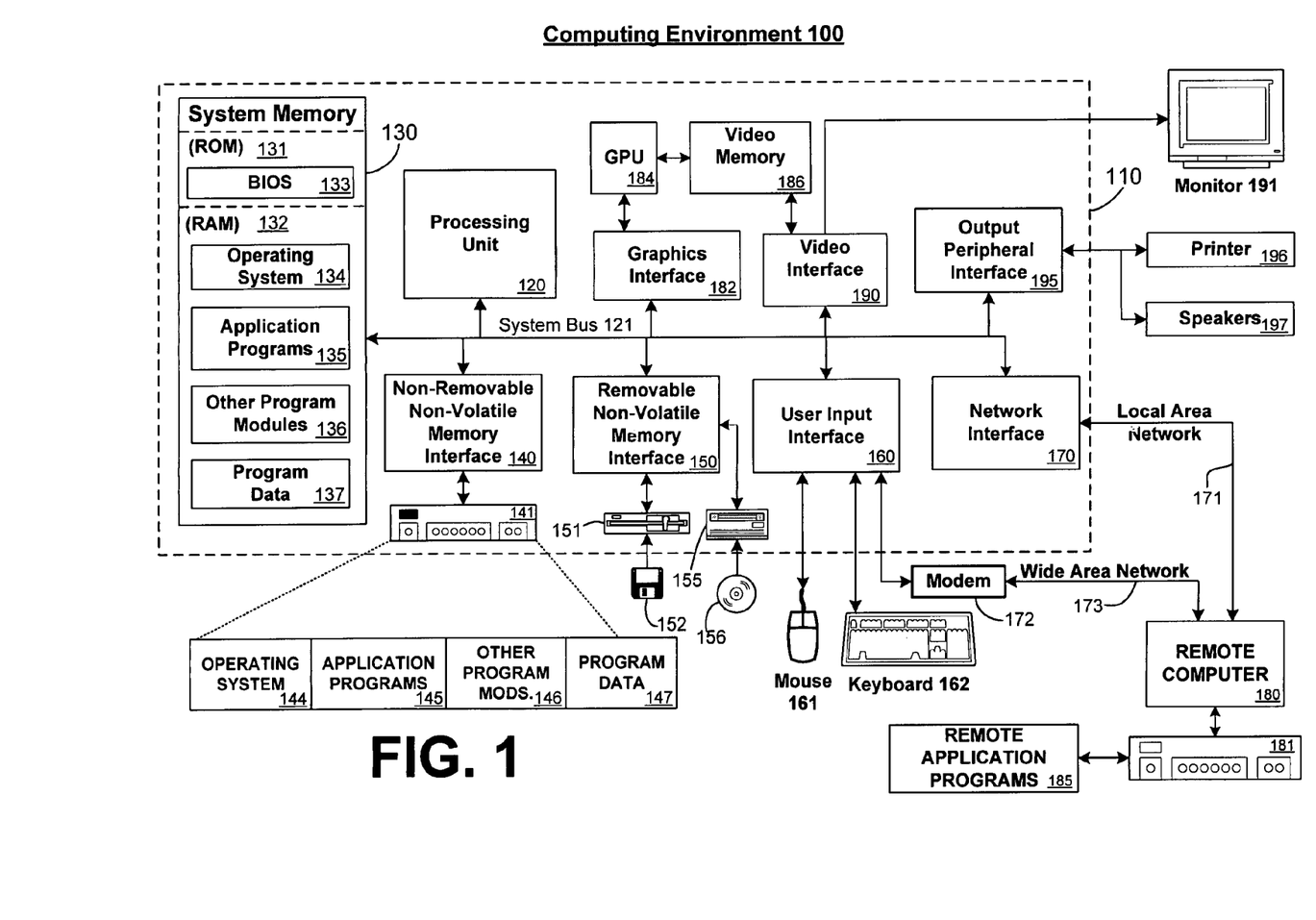
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
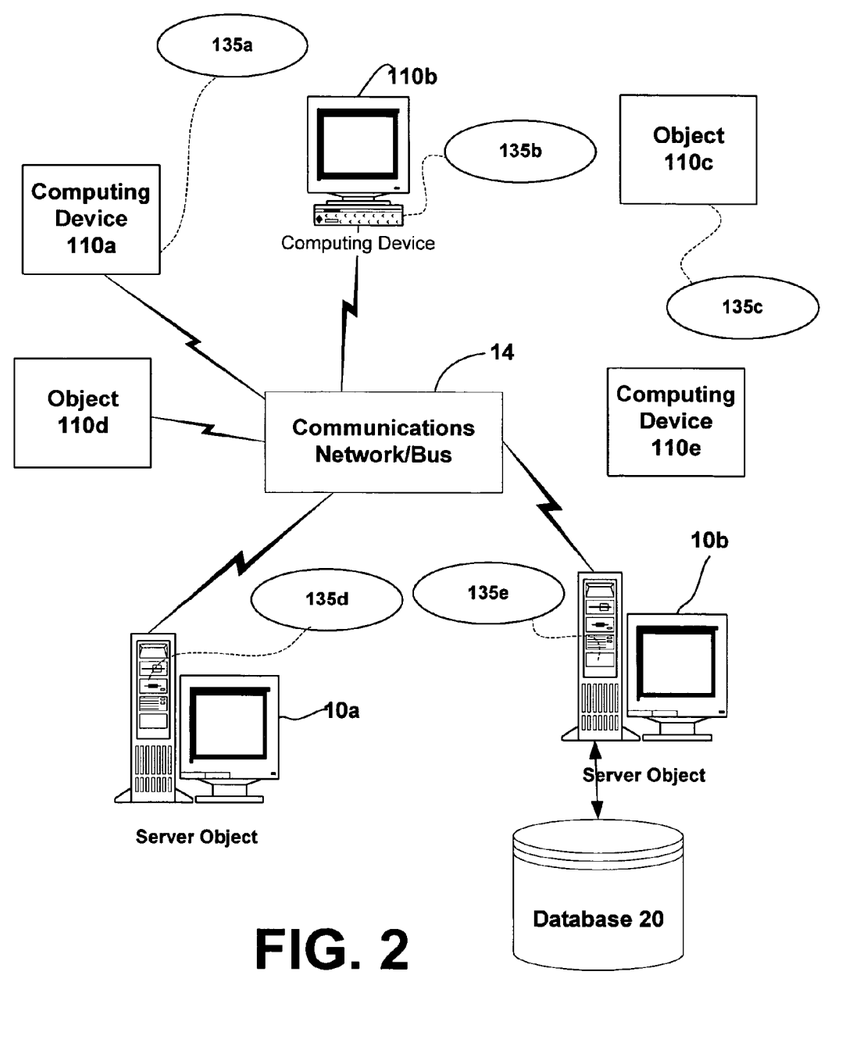
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Access Management Overview

Figure 3:
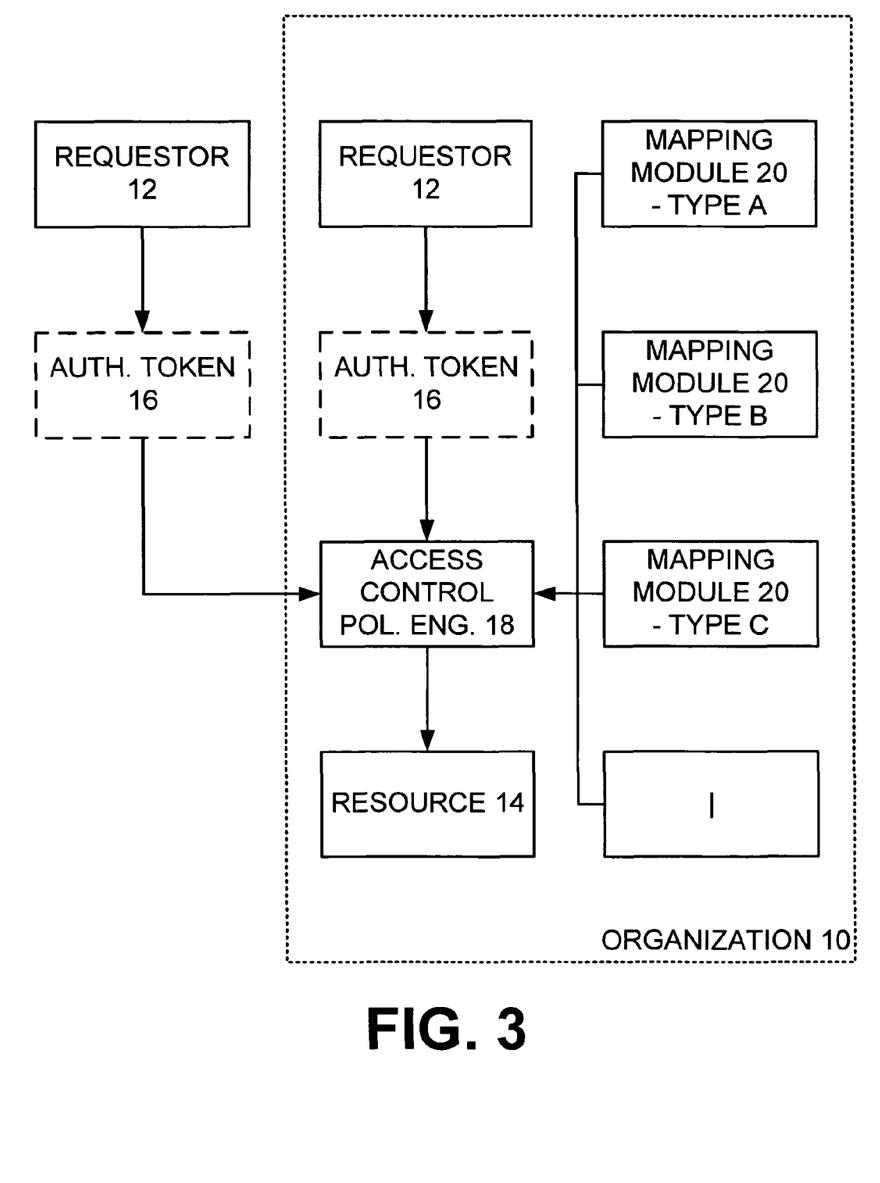
FIG. 3 is a block diagram showing an architecture wherein an organization has a resource, an access control policy engine for determining whether to allow a requestor access to the resource, and a plurality of mapping modules, each for mapping a particular type of security token of the requestor to a security claim having a common format, in accordance with one embodiment of the present invention.

As is known, and referring now to FIG. 3, in access management as applied to digital information, within the context of an organization 10 or the like, a requestor 12 interior to or exterior from the organization 10 requesting information from a resource 14 of the organization 10 must present an security token 16 to an access control policy engine 18 associated with the resource 12. As may be appreciated, the access control policy engine 18 employs the security token 16 to determine whether the requestor 12 should in fact be granted access to the resource 12 based on a set of rules. Thus, the security token 16 may identify the requestor 12 and may for example include a relationship of the requestor 12 to the organization 10, but more significantly the security token 16 may include authorization information relating to the requestor 12, such as for example what level of access the requestor 12 should have with respect to the resource 14, what sort of security should be associated with the requestor 12, and the like.

As may be appreciated, the organization 10 may be any appropriate type of organization without departing from the spirit and scope of the present invention. For example, the organization 10 may be a public corporation, a private company, a governmental body, a non-profit charity, a research foundation, an on-line store, a public source of on-line information, a private source of information, a highly secure database, a low-security index, etc. As may also be appreciated, the requestor 12 interior to or exterior from the organization 10 may be any appropriate requestor, also without departing from the spirit and scope of the present invention. For example, the requestor 12 may be any employee, a director, a supervisor, an officer, a server, a computing device, etc.

Generally, the resource 14 receives requests for access to digital information or services by way of the access control policy engine 18 and the access control policy engine 18 provides such access according to pre-defined rules. Such digital information may include digital content or data or the like, and such digital services may include printing services, rendering services, data transformation services, or the like. Thus, such resource 14 and such digital information may be any appropriate digital resource and digital information without departing from the spirit and scope of the present invention.

The pre-defined rules that the access control policy engine 18 follows in providing access to a requestor 12 may be any rules without departing from the spirit and scope of the present invention. Within the context of the present invention, such rules at least implicitly require that the requestor 12 present the security token 16 to the access control policy engine 18 along with the request for access to the resource 12, and may also require that the requestor 12 have a minimum level of position if interior to the organization 10 or a minimum security level if exterior to the organization 10, as might also be set forth with the security token 16, that the requestor have the right to access the resource 14, as might be set forth within the security token 16, and the like. Such rules might for example also require that the request from the requestor 12 be received at a particular time of day, that the requestor 12 be requesting access to the resource 14 by way of a particular type of connection, etc.

The security token 16 as presented by and representing the requestor 12 maybe any appropriate security token without departing from the spirit and scope of the present invention. For example, the security token 16 may be a digital certificate as issued to the requestor 12 by an administrator 18 of the organization 10 that is trusted by the access control policy engine 18. Likewise, the security token 16 could be a Kerberos ticket or some other form of token such as a REL license or an XML-based token, or some other form of identifying indicia. Although not necessary for purposes of the present invention, it may be the case that the security token 16 includes information therein as is appropriate for identifying the requestor 12. For example, the digital certificate 16 may include the name of the requestor 12, the position of the requestor 12 if interior to the organization. At a minimum, though, the security token 16 should include some sort of information adequate to allow the access control policy engine to determine the rights of the requestor 12 with respect to accessing the resource 14. Such information may include identifying information for the requestor, attributes of the requestor, or an expression of the rights of the requestor for the resource as determined by some administrative authority. In at least some instances, the security token 16 is signed based on the contents thereof and according to a private key of a public-private key pair, and may be validated according to an attached chain of certificates including the corresponding public key.

The security token 16 may itself have an associated public-private key pair, with the public key in the certificate 16. Thus, the resource 14 may respond to a requestor 12 with data encrypted either directly or indirectly according to the public key of the certificate 16 of such requestor 12. Accordingly, the requestor 12 may access such data by appropriate application of the corresponding private key of the security token 16.

The access control policy engine 18 may be instantiated on a server or the like, and may be any appropriate access control policy engine that is trusted to make decisions on access to the resource 14 without departing from the spirit and scope of the present invention, presuming of course that the administrator 18 is capable of processing multiple types of security tokens 16 in the manner set forth herein. Presumably, the rules of the access control policy engine 18 require that any request from any requestor 12 be accompanied by a security token 16, and that the security token 16 satisfy some minimum set of criteria. Such criteria are known or should be apparent to the relevant public, and therefore need not be set forth herein in any detail. For example, the security token 16 itself should be valid and any validity period set forth therein should be current. Likewise, if the security token 16 specifies particular rights and conditions, such rights and conditions should be checked to determine that the rights allow the access sought and that the conditions are satisfied.

Controlling Access to Resource 14 Based on Mapped Security Token 16

In one embodiment of the present invention, in order for the access control policy engine 18 to accept any of multiple types of security token 18 from a requestor 12 in the course of such requestor 12 requesting access to a resource 14, the access control policy Engine 18 maps the access decision information in the security token 18 of the requestor 12 to a common format, and then applies the rules thereof in conjunction with a local access control policy to decide whether to grant access based on the commonly formatted access-decision information. The common format employed by the access control policy engine 18 is thus a uniform mechanism for handling a variety of types of security tokens 16, providing a semantically consistent representation of the information regardless of type and allowing access decisions to be made by the access control policy engine 18 in a manner independent of the security token 16. As a result, the rules employed by the access control policy engine 16 can be set forth in a generic manner that is inherently adaptable to almost any type of security token 16 that may be provided by a requestor 12.

Moreover, and also in one embodiment of the present invention, rather than including mapping procedures for every type of security token 16, such mapping procedures for each of at least some types of security tokens 16 are stored in a corresponding mapping module 20, as seen in FIG. 3. As may be appreciated, each mapping module 20 is made available to the access control policy engine 16 in the manner of a plug-in module or the like. Thus, a new type of security token 16 is accommodated by providing the corresponding mapping module 20 to the access control policy engine 18, and such access control policy engine 18 need not be updated or otherwise reconstructed in view of such new type of security token 16. Note that if deemed advisable, the access control policy engine 16 may be provided internally with the functionality of at least some mapping modules 20 corresponding to types that are well-known, standard, unchanging, or the like.

In one embodiment of the present invention, the common format employed by the access control policy engine 18 is characterized by including the following elements:

P a principal identifier that identifies the requestor 12, either as an individual or a member of some group, for example;

R a right possessed by P with respect to some target T (see below) and expressing the relationship between P and T, if T is an attribute or property of the requestor the right to 'possess' T is interpreted as asserting P has that attribute. If T is a resource known to the access control policy engine, then R may express the rights of P to operate on the resource 14, such as the right to 'read' a file, as determined by the security token issuing authority;

T a target identifier that identifies the target of a right, can refer to a property, an attribute, a device such as a resource 14, a data structure, etc.;

C any condition on the right R with respect to the target T that the access control policy engine 18 is to evaluate to true or false and can state any computation returning a Boolean value using any data available to the access control policy engine 18, such as for example a temporal constraint, a required revocation check, or the existence of other conditions; and I an issuer identifier that identifies an entity that issued the security token 16 and is asserting the right R which the principal P has to the target T and the corresponding conditions C.

Together, P, R, T, C, and I allow most any type of security token 16 to be mapped by the access control policy engine 18 into the common format by way of a corresponding mapping module 20. Thus, the common format allows most any security token 16 to be viewed as encoding a collection of security claims. For each type of security token 16, a transform is defined that maps from the security token 16 encoding to a collection of security claims using a shared dictionary of P, R, T, C, and I types. The dictionary is finite but extensible and spans the set of assertions defined by standards relating to the types of security tokens 16 and interoperability profiles presently in use. By mapping to a security claims representation, the access control policy engine 18 is provided with a complete and uniform statement of the relevant information about the requestor 12 regardless of the type of security token 16 employed to represent same.

Following are examples of a number of types of security tokens 16 as mapped to security claims:

Kerberos Ticket—A Kerberos ticket has a symmetric key associated with the requestor 12 and a collection of security identifiers (SIDs) representing the domain account and groups of the requestor 12. The symmetric key may thus be viewed as P and the SID values as T possessed by P. The Kerberos Key Distribution Center (KDC) is the issuer I, and presuming the token has no relevant conditions, a number of security claims may be expressed based on the token in a (P, R, T, C, I) form as:

(keyHolder S1, possess, SID="S-1-5-12 . . . ", null, KDC)

(keyHolder S1, possess, SID="S-1-7-34 . . . ", null, KDC)

etc.

X.509 Certificate—An X.509 certificate has a public key value associated with a subject name and optional attributes such as an alternate subject name which could include an email address. The issuer is the holder of another public-private key pair. Again presuming the certificate has no relevant conditions, a number of security claims may be expressed based on the certificate in a (P, R, T, C, I) form as:

(keyHolder K1, possess, SubjectName="CN=Bob O=MyOrg", null, keyHolder K2)

(keyHolder K1, possess, eMailName="bob@myorg.com", null, keyHolder K2)

MPEG REL License—An MPEG REL license is constructed according to an eXtensible Markup Language (XML) that defines the MPEG Rights Expression Language (REL) as approved by the International Organization for Standardization (ISO). As may be appreciated, an MPEG REL license can have grants of various rights for a principal or principals and is issued by some other principal holding cryptographic keys. Once again presuming the license has no relevant conditions, such license with two property grants and a capability grant could be expressed as security claims in a (P, R, T, C, I) form as:

(keyHolder K1, possess, Role="administrator", null, keyHolder K3)

(keyHolder K1, possess, eMailName="bob@myorg.com", null, keyHolder K3)

(keyHolder K1, read/write, file=\\amachine\public\foo.txt, null, keyHolder K3)

Here, the types 'keyHolder', 'Role', 'eMailName', etc are defined in a shared dictionary, ensuring a semantically consistent expression of the information and allowing one to compare whether two principals, rights, resources, or conditions are the same. Access control policy (i.e., the rules employed by the access control policy engine 18) may thus be written in terms of the dictionary terms and therefore evaluate a given access request by evaluating the policy and requestor claims rather than the specific encoding of any given type of security token 16.

Figure 4:
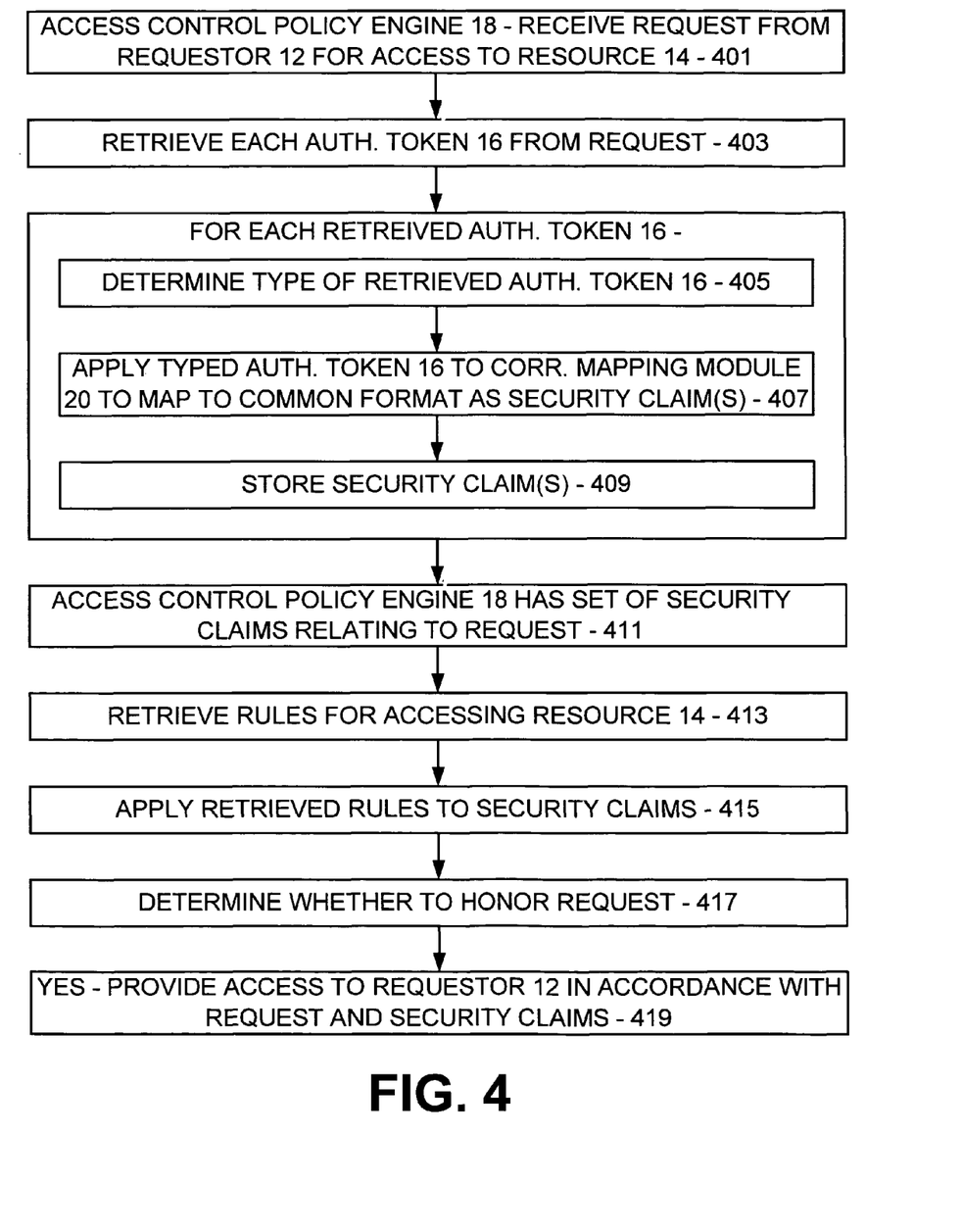
FIG. 4 is a flow diagram showing key steps performed by the access control policy engine of FIG. 3 in determining whether to allow the requestor access to the resource in accordance with one embodiment of the present invention.

With the common format as set forth herein, then, and turning now to FIG. 4, a request from a requestor 12 for access to a resource 14 is received by an access control policy engine 18 associated with the resource 14 (step 401). Note that the resource 14 may include the access control policy engine 18 or may be separate therefrom, and that the resource 14 may have more than one access control policy engine 18 therefor and each access control policy engine 18 may be associated with more than one resource 14.

At any rate, the request from the requestor 12 presumably includes some sort of security token 16 and may in fact include multiple security tokens 16, and the access control policy engine 16 thus for each security token 16 in the request retrieves same (step 403) and determines the type of such retrieved security token 16 (step 405). Determining the type of security token 16 may be performed in any appropriate manner without departing from the spirit and scope of the present invention. For example, it may be the case that the security token 16 includes a predefined type field, or it may be the case that the access control policy engine 18 includes a typer that is constructed to determine the type based on extant characteristics. If the latter, the typer may be provided with such extant characteristics for each type of security token 16 from a corresponding mapping module 20 associated with and available to the access control policy engine 18. In such a situation, then, a type of security token 16 is recognized by the access control policy engine 16 only if the corresponding mapping module 20 is available to the access control policy engine 16.

Based on the determined type of the retrieved security token 16, then, the access control policy engine 18 applies such retrieved security token 16 to the corresponding mapping module 20 to map the information in the retrieved security token 16 to the common format as one or more security claims (step 407), and stores each security claim in an appropriate location (step 409). Once all security tokens 16 from a request are processed, and as should be appreciated, the access control policy engine 18 should have a set of security claims relating to the request (step 411), and thus may retrieve a set of rules for accessing the resource 14 from an appropriate location (step 413) and apply the retrieved set of rules for accessing the resource 14 to such set of security claims (step 415).

Although the rules may be any appropriate rules without departing from the spirit and scope of the present invention and thus need not be set forth herein in any detail, it is to be appreciated that such rules should be written to take advantage of the common format of the security claims. Thus, upon applying the rules to the security claims as at step 415, the access control policy engine 18 may conclude with a determination based on such application regarding whether the request from the requestor 12 is to be honored (step 417).

If the request from the requestor 12 is to be honored as at step 417, the access control policy engine 18 provides access to the requestor 12 in accordance with the request and the rights of the requestor 12 as set forth within the security claims (step 419). Thus, it may be that the request is passed to the resource 14 and the resource 14 returns some sort of data to the requestor 12, or that the requestor is allowed to browse data stored at the resource 14, or that the requestor is allowed to employ the resource 14 to perform a service, for example.

If however the request from the requestor 12 is not to be honored as at step 417, the access control policy engine 18 may itself return some sort of notice of denial to the requestor 12, perhaps with an explanation if deemed advisable. Such explanation may for example suggest a different type of request, the need for a different type of security token 16, a reason why the request was denied, or the like.

CONCLUSION

It is to be appreciated that while the present disclosure speaks in terms of a resource 14 performing certain actions, it may in fact be the case that a resource manager is performing such actions on behalf of the resource 14. As may be appreciated, it is in fact oftentimes the case that a resource manager manages a resource 14 and enforces access control decisions for the resource 14. Nevertheless, unless otherwise necessary, a resource 14 performing an action can be considered the equivalent of a resource manager performing the action on behalf of the resource 14, and vice versa.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided by which an access control policy engine 18 can control access to a resource 14 based on any of multiple received types of security tokens 16, and without the need for local accounts or multiple policy evaluation paths. The access control policy engine 18 maps the information in each of one or more types of security token 16 received with a request to one or more security claims having a common access-decision format, and then decides whether to grant access based on all of the mapped security claims. The access control policy engine 18 maps each type of security token 16 based on a corresponding mapping module 20, whereby the access control policy engine 18 can accommodate a new type of security token 16 based on a corresponding new mapping module 20.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A processor implemented method in connection with a requestor submitting a request to access a digital resource, the request including at least one security token associated with the requestor, each security token of the request containing access decision information useful for determining whether to allow the request, each security token having one of a plurality of types, the method for an access control policy engine associated with the resource to determine whether to allow the request, the method comprising the access control policy engine:

receiving at the processor the request with each security token thereof;

retrieving each security token from the request;

processing by the processor each retrieved security token by:

determining the type of such retrieved security token;

mapping the access decision information in the retrieved security token to a common format, wherein the common format comprises at least one security claim setting forth a right of the requestor, and wherein the access control policy engine maps the access decision information in the retrieved security token to the common format as at least one security claim setting forth adequate information to determine a right of the requestor as:

P a principal identifier that identifies the requestor;

R a right possessed by P with respect to a target T and expressing a relationship between P and T;

T a target identifier that identifies the target of a right;

C any condition on R with respect to T that the access control policy engine is to evaluate; and I an issuer identifier that identifies an entity that issued the security token and conferred R with respect to T on P, the access control policy engine having a set of security claims relating to the request after having processed the retrieved security tokens;

retrieving a set of rules for accessing the resource;

applying the retrieved set of rules for accessing the resource to the set of security claims to determine whether to allow the request from the requestor; and if the request from the requestor is to be allowed, providing the requestor access to the resource in accordance with the request and the rights of the requestor as set forth within the set of security claims.

2. The method of claim 1 wherein the access control policy engine is supplied with a plurality of mapping modules, each mapping module corresponding to one of the plurality of types and supplying mapping procedures for mapping the access decision information in a security token of such type to the common format, the method comprising the access control policy engine applying the retrieved security token based on the determined type thereof to the mapping module corresponding to such determined type to map the access decision information in the retrieved security token to the common format as at least one security claim setting forth sufficient information to determine a right of the requestor.

3. The method of claim 2 wherein determining the type of the retrieved security token comprises determining the type based on extant characteristics as defined in the mapping module corresponding to the retrieved security token.

4. The method of claim 2 comprising applying the retrieved security token based on the determined type thereof to a mapping module corresponding to such determined type and separate from but coupled to the access control policy engine.

5. The method of claim 2 comprising applying the retrieved security token based on the determined type thereof to a mapping module corresponding to such determined type and integrated within the access control policy engine.

6. The method of claim 1 wherein determining the type of the retrieved security token comprises reviewing a predefined type field of the security token.

7. The method of claim 1 comprising retrieving and applying a set of rules for accessing the resource that are constructed according to the common format of the security claims.

8. A computer-based system comprising a digital resource to which a requestor requests access based on a request including at least one security token associated with the requestor, each security token of the request containing access decision information useful for determining whether to allow the request, each security token having one of a plurality of types, the system comprising:

a processor that is programmed to implement an access control policy engine associated with the resource and controlling access thereto to determine whether to allow the request, the access control policy engine:

receiving the request with each security token thereof;

retrieving each security token from the request;

processing each retrieved security token by determining the type of such retrieved security token;

mapping the access decision information in the retrieved security token to the common format, wherein the common format comprises at least one security claim setting forth adequate information to determine a right of the requestor, and wherein the access control policy engine maps the access decision information in the retrieved security token to the common format as at least one security claim setting forth adequate information to determine a right of the requestor as:

P a principal identifier that identifies the requestor;

R a right possessed by P with respect to a target T and expressing a relationship between P and T;

T a target identifier that identifies the target of a right;

C any condition on R with respect to T that the access control policy engine is to evaluate; and I an issuer identifier that identifies an entity that issued the security token and conferred R with respect to T on P, the access control policy engine having a set of security claims relating to the request after having processed the retrieved tokens;

retrieving a set of rules for accessing the resource;

applying the retrieved set of rules for accessing the resource to the set of security claims to determine whether to allow the request from the requestor; and if the request from the requestor is to be allowed, the processor providing the requestor access to the resource in accordance with the request and the rights of the requestor as determined based on the set of security claims.

9. The system of claim 8 further comprising a plurality of mapping modules implemented by the processor, each mapping module corresponding to one of the plurality of types and supplying mapping procedures for mapping the access decision information in an security token of such type to the common format, the access control policy engine applying the retrieved security token based on the determined type thereof to the mapping module corresponding to such determined type to map the access decision information in the retrieved security token to the common format as at least one security claim setting forth adequate information to determine a right of the requestor.

10. The system of claim 9 wherein the access control policy engine determines the type of the retrieved security token based on extant characteristics as defined in the mapping module corresponding to the retrieved security token.

11. The system of claim 9 wherein at least one mapping module is separate from but coupled to the access control policy engine.

12. The system of claim 9 wherein at least one mapping module is integrated within the access control policy engine.

13. The system of claim 8 wherein the access control policy engine determines the type of the retrieved security token by reviewing a predefined type field of the security token.

14. The system of claim 8 wherein the access control policy engine retrieves and applies a set of rules for accessing the resource that are constructed according to the common format of the security claims.

15. The system of claim 8 wherein the resource includes the access control policy engine.

16. The system of claim 8 wherein the access control policy engine is separate from the resource.

* * * * *